W. DE FREES.
SPRING TIRE.
APPLICATION FILED JUNE 24, 1914.
1,156,348.
Patented Oct. 12, 1915.
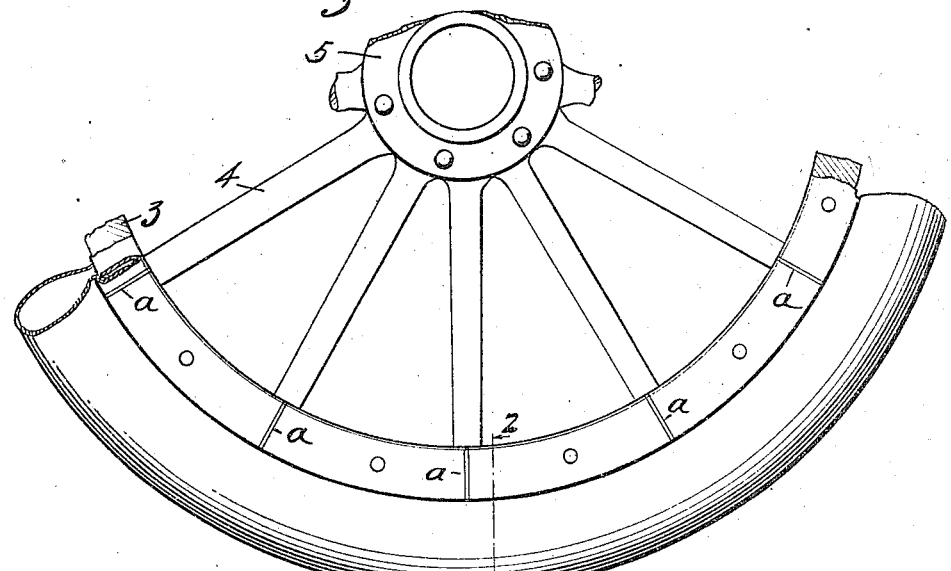
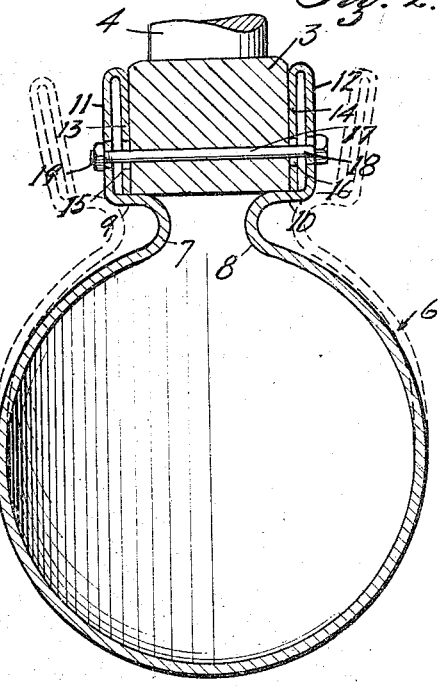
Witnesses:
James M. Abbitt
Marguerite Bates
Inventor
William De Frees
By
Harrah & Strause
Attys.

UNITED STATES PATENT OFFICE.

WILLIAM DE FREES, OF HAWTHORNE, CALIFORNIA.

SPRING-TIRE.

1,156,348.  Specification of Letters Patent.  Patented Oct. 12, 1915.

Application filed June 24, 1914. Serial No. 847,006.

*To all whom it may concern:*

Be it known that I, WILLIAM DE FREES, a citizen of the United States, residing at Hawthorne, in the county of Los Angeles, State of California, have invented new and useful Improvements in Spring-Tires, of which the following is a specification.

This invention relates to a spring tire.

It is the object of this invention to provide a tire which is particularly adapted for use on automobiles and like vehicles as a substitute for the pneumatic rubber tires now generally in use, and which tire is so constructed as to have the same general appearance and characteristics of such pneumatic tires.

A further object is to provide a one-piece metallic tire so constructed as to be resilient and thereby cushion shocks delivered thereto.

Another object is to provide a one-piece continuous metallic tire so constructed that it may be readily attached and removed from a wheel felly and which, by reason of its metallic character, is strong and durable and obviates inflation and difficulties incident to punctures as are common in inflatable rubber tires.

The invention is illustrated in the accompanying drawing, in which:

Figure 1 is a view in side elevation of the lower portion of a wheel showing the tire as applied thereto. Fig. 2 is an enlarged detail section on the line 2—2 of Fig. 1, showing the construction of the tire and illustrating the manner of mounting same on the wheel felly.

More specifically, 3 indicates the wheel felly which is mounted on spokes 4 carried by a hub 5 in the manner common in wheel construction. This wheel felly 3 is the ordinary felly, preferably rectangular in cross-section, and usually formed of wood.

The tire constituting the present invention comprises a sheet metal structure constructed in the form of an annular tube 6 which comprises the main body portion of the tire and the outer circumferential portion of which constitutes the tread thereof.

The tube 6 is open on its inner perimeter and the metal of which it is formed, preferably sheet steel, is turned upwardly and outwardly to form U-shaped sections 7 and 8 on the inner periphery of the tire; the upper portions of the U-shaped members 7 and 8 extending outwardly in opposite directions to each other to form seat portions 9 and 10 on which the outer periphery of the felly 3 is adapted to rest and be engaged by the tire when the latter is in place, as shown in Fig. 2.

The outer ends of the oppositely extending seat portions 9 and 10 are bent upwardly to extend on opposite sides of the felly 3, thus forming annular flanges 11 and 12. These flanges 11 and 12 are turned inwardly toward each other at their upper edges and terminate in lip portions 13 and 14 extending parallel with the inner faces of the flanges 11 and 12 and adapted to abut against the sides of the felly 3. Flanges 11 and 12 including the lip portions 13 and 14 are slit radially from the upper annular edges downwardly to the seat portions 9 and 10 as at —*a*—, clearly shown in Fig. 1 of the drawing to permit the tire being readily assembled on the felly 3 of the wheel.

To mount the tire on the wheel felly the flanges 11 and 12 and the U-shaped portions 7 and 8 are spread apart, as indicated in dotted lines in Fig. 2, to permit the crowding of the felly between the portions 7 and 8 so that the felly may be introduced into position within the tire; the felly being withdrawn from between the U-shaped portions 7 and 8 when the felly is encircled by the tire so as to be disposed within the channel formed by the flanges 11 and 12 and seated on the portions 9 and 10.

To secure the tire in place the flanges 11 and 12 are formed with opposed perforations 15 and 16 which register with transverse perforations 17 formed in the felly 3 and bolts 18 are passed through the perforations 15 and 16 and 17, as shown in Fig. 2, and nuts 19 are screwed thereon to clamp the tongues 13 and 14 against the opposite sides of the felly 3. The nuts 19 are tightened sufficiently to place the tongues 13 and 14 under tension which will cause the tongues to exert an outward pressure on the flanges 11 and 12 and at the same time permit a slight lateral spring movement of the flanges 11 and 12 in relation to the felly 3.

In the operation of the invention, when a load is imposed upon the wheels and the tread portion of the tire is resting on the ground the load will be cushioned on the U-shaped portions 7 and 8 and the curved side portions of the tire which have sufficient resiliency to absorb the shocks delivered to the tire.

What I claim is:

1. A spring tire, comprising an annular metallic tube substantially circular in cross section having opposite extending U-shaped portions extending around its inner periphery terminating at their outer edges in flanges adapted to extend on opposite sides of the wheel felly, and spring tongues formed on the inner edges of said flanges extending parallel therewith adapted to bear against the opposite sides of the wheel felly.

2. A vehicle tire, comprising a tube of resilient metal bent to conform to the circumferential periphery of a wheel felly and having oppositely extending U-shaped portions on its inner periphery terminating in outwardly extending portions adapted to engage the outer periphery of the wheel felly and terminating in flanges adapted to extend on opposite sides of the wheel felly, inwardly extending tongues on said flanges adapted to bear against the sides of the wheel felly, and means for securing said flanges to the felly, whereby said tongues are rendered under tension.

In witness that I claim the foregoing I have hereunto subscribed my name this 10th day of June, 1914.

WILLIAM DE FREES.

Witnesses:
MARGUERITE BATES,
MARIE BATTEY.